United States Patent
Wang et al.

(10) Patent No.: US 11,318,615 B2
(45) Date of Patent: May 3, 2022

(54) MOTION PLANNING METHOD FOR ROBOT ARMS, COMPUTING DEVICE AND ROBOT

(71) Applicant: CLOUDMINDS (SHENZHEN) ROBOTICS SYSTEMS CO., LTD., Shenzhen (CN)

(72) Inventors: Tianhao Wang, Shenzhen (CN); Shenhua Xu, Shenzhen (CN)

(73) Assignee: CLOUDMINDS ROBOTICS CO., LTD., Shanghai (CN)

(*) Notice: Subject to any disclaimer, the term of this patent is extended or adjusted under 35 U.S.C. 154(b) by 254 days.

(21) Appl. No.: 16/730,575

(22) Filed: Dec. 30, 2019

(65) Prior Publication Data
US 2020/0215690 A1 Jul. 9, 2020

(30) Foreign Application Priority Data
Dec. 29, 2018 (CN) .......................... 201811643928.6

(51) Int. Cl.
*B25J 9/16* (2006.01)

(52) U.S. Cl.
CPC ............. *B25J 9/1664* (2013.01); *B25J 9/163* (2013.01); *B25J 9/1651* (2013.01)

(58) Field of Classification Search
CPC ......... B25J 9/163; B25J 9/1664; B25J 9/1651
See application file for complete search history.

(56) References Cited

U.S. PATENT DOCUMENTS

| 6,023,645 A * | 2/2000 | Harima ...................... B25J 9/00 |
| | | 700/250 |
| 2014/0297031 A1* | 10/2014 | Iwasaki .................. B25J 9/1664 |
| | | 700/245 |
| 2021/0212777 A1* | 7/2021 | Cheng .................... B25J 9/1689 |

FOREIGN PATENT DOCUMENTS

CN  103955619 B  * 12/2017

* cited by examiner

*Primary Examiner* — Abby Y Lin
*Assistant Examiner* — Dylan Brandon Mooney (57) ABSTRACT

A motion planning method for robot arms includes: calculating an arm angle range of each pose of a tail end of a robot arm in the motion trajectory; calculating a start arm angle value of a start pose of the tail end of the robot arm in the motion trajectory; calculating an arm angle proportion according to the start arm angle value and the arm angle range of the start pose; identifying an abruptly changing arm angle range in the arm angle range of each pose according to a upper boundary curve and a lower boundary curve; calculating an arm angle of a pose corresponding to the abruptly changing arm angle range; calculating arm angles corresponding to the other poses according to the arm angle proportion; and calculating an angle of a joint of the robot arm.

15 Claims, 8 Drawing Sheets

MOTION PLANNING METHOD FOR ROBOT ARMS, COMPUTING DEVICE AND ROBOT

CROSS-REFERENCE TO RELATED APPLICATIONS

This application claims priority to Chinese Patent Application No. 201811643928.6, filed with the Chinese Patent Office on Dec. 29, 2018, titled "MOTION PLANNING METHOD FOR ROBOT ARMS, ROBOT ARMS AND ROBOT", the entire contents of which are incorporated herein by reference.

TECHNICAL FIELD

Embodiments of the present application relate to the technical field of robot arm control, and in particular, relate to a motion planning method for robot arms, a computing device and a robot.

BACKGROUND

Robots are machines that simulate human behaviors or thoughts, or simulate other living things. With the developments of the artificial intelligence technology and the mechanical design technology, robots become more and more flexible, and the degree of intellectualization is becoming higher and higher, such that the robots are being more and more widely used.

During process of implementing the present application, the inventors have identified that motion planning for robot arms has always been the focus in studies of robotics. In such issues, a start pose and an end pose are generally known, and how to select a complete and optimal path is critical for this issue. With respect to a general 6-DOF (Degree Of Freedom) serial robot, path planning is mature and successful. Since the number of inverse solutions of the 6-DOF robot kinematics is limited, currently, a group of joint angle values which has the smallest difference from an angle at a previous moment only need to be selected. With respect to a higher-dimension robot, for example, a 7-DOF robot, each tail-end pose corresponds to numerous groups of joint values. Therefore, a group of optimal solutions are difficult to be selected to ensure continuity of angles and angular velocity during the motion. However, non-continuous variations of the joint angles may cause shakes during motion of the robot, which severely affects the motion effect of the robot and causes damages to the robot.

SUMMARY

An embodiment of the present application provides a motion planning method for robot arms. The method includes: acquiring a motion trajectory of a tail end of a robot arm; calculating an arm angle range of each pose of the tail end of the robot arm in the motion trajectory; generating an upper boundary curve and a lower boundary curve according to the arm angle range; calculating a start arm angle value of a start pose of the tail end of the robot arm in the motion trajectory; calculating an arm angle proportion according to the start arm angle value and the arm angle range of the start pose; identifying an abruptly changing arm angle range in the arm angle range of each pose according to the upper boundary curve and the lower boundary curve; calculating an arm angle of a pose corresponding to the abruptly changing arm angle range according to a predetermined correction model; calculating arm angles corresponding to the other poses according to the arm angle proportion, wherein the other poses are poses other than the pose corresponding to the abruptly changing arm angle range; and calculating an angle of a joint of the robot arm corresponding to each pose according to a pose of the tail end of the robot arm in the motion trajectory and the arm angle of each pose.

Another embodiment of the present application provides a computing device. The computing device includes: a processor, a memory, a communication interface and a communication bus; wherein the processor, the memory and the communication interface communicate with each other via the communication bus; and the memory is configured to store at least one executable instruction, wherein the executable instruction, when being executed by the processor, causes the processor to perform the steps of: acquiring a motion trajectory of a tail end of a robot arm; calculating an arm angle range of each pose of the tail end of the robot arm in the motion trajectory; generating an upper boundary curve and a lower boundary curve according to the arm angle range; calculating a start arm angle value of a start pose of the tail end of the robot arm in the motion trajectory; calculating an arm angle proportion according to the start arm angle value and the arm angle range of the start pose; identifying an abruptly changing arm angle range in the arm angle range of each pose according to the upper boundary curve and the lower boundary curve; calculating an arm angle of a pose corresponding to the abruptly changing arm angle range according to a predetermined correction model; calculating arm angles corresponding to the other poses according to the arm angle proportion, wherein the other poses are poses other than the pose corresponding to the abruptly changing arm angle range; and calculating an angle of a joint of the robot arm corresponding to each pose according to a pose of the tail end of the robot arm in the motion trajectory and the arm angle of each pose.

Still another embodiment of the present application provides a robot. The robot includes the computing device aforementioned.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

Figure 1:
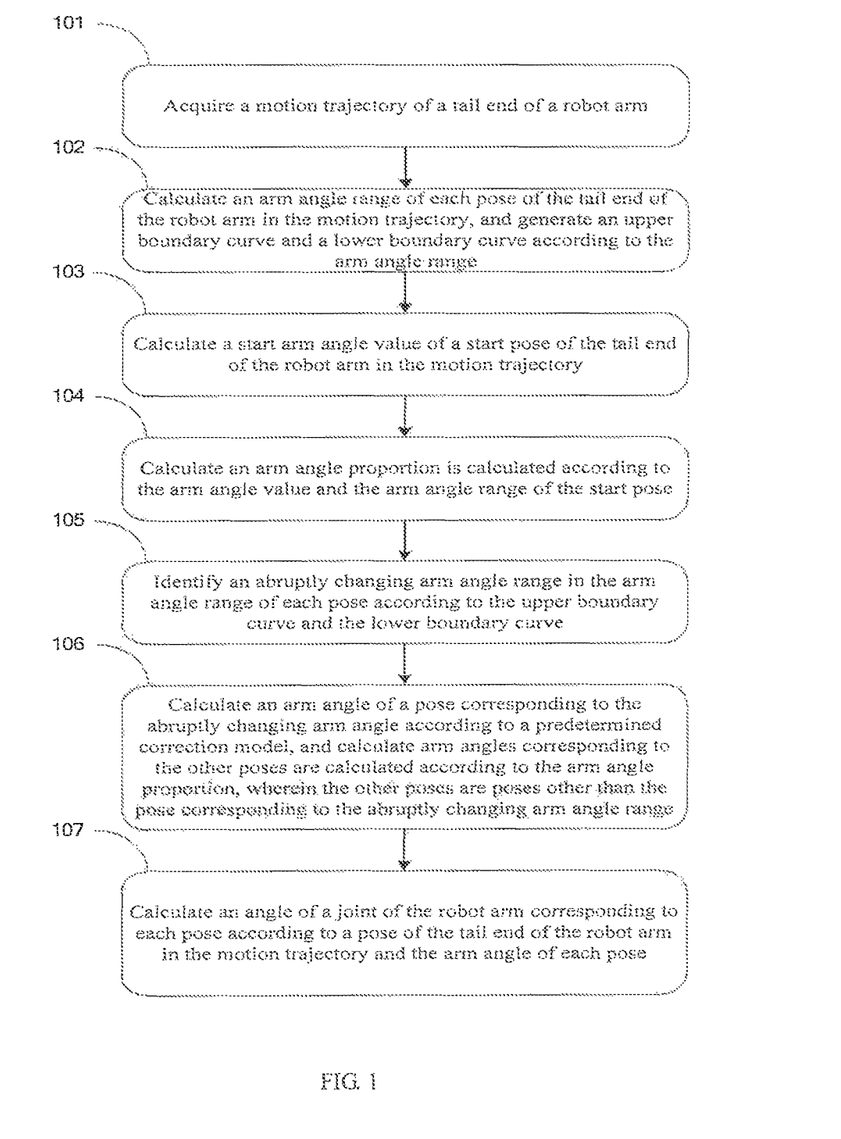
FIG. 1 is a flowchart of a motion planning method for a robot arm according to an embodiment of the present application.

Referring to FIG. 1, FIG. 1 is a flowchart of a motion planning method for robot arms according to an embodiment of the present application. The method includes the following steps:

Step 101: A motion trajectory of a tail end of a robot arm is acquired.

The robot arm is constituted by a plurality of joints, and rotation of the robot arm is implemented by linkage and cooperation of the joints. An arm angle refers to an angle by which a surface formed by a shoulder joint, an elbow joint and a wrist joint of the robot arm swings about a line connecting the shoulder joint to the wrist joint.

Figure 2:
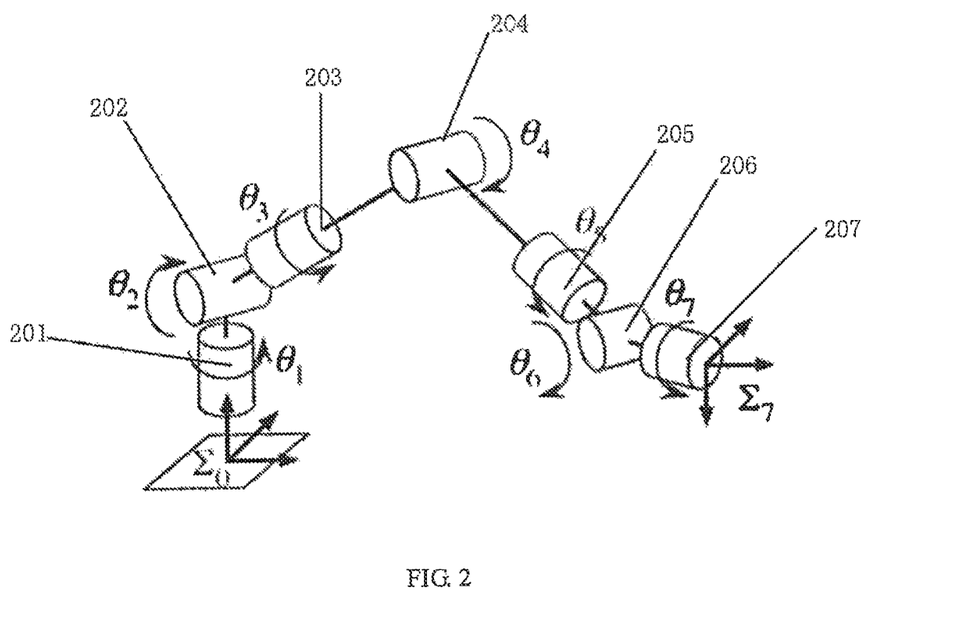
FIG. 2 is a schematic diagram of a robot arm in the motion planning method for robot arms according to an embodiment of the present application.

The tail end position of the robot arm refers to a position of an end joint of the robot arm. As illustrated in FIG. 2, using a 7-DOF robot arm as an example, the 7-DOF robot arm totally has seven joints. Each joint is rotatable about a direction. A joint 205, a joint 206 and a joint 207 are located at a tail end of the robot arm. Therefore, positions of the joint 205, the joint 206 and the joint 207 are the tail end positions of the robot arm.

Figure 3:
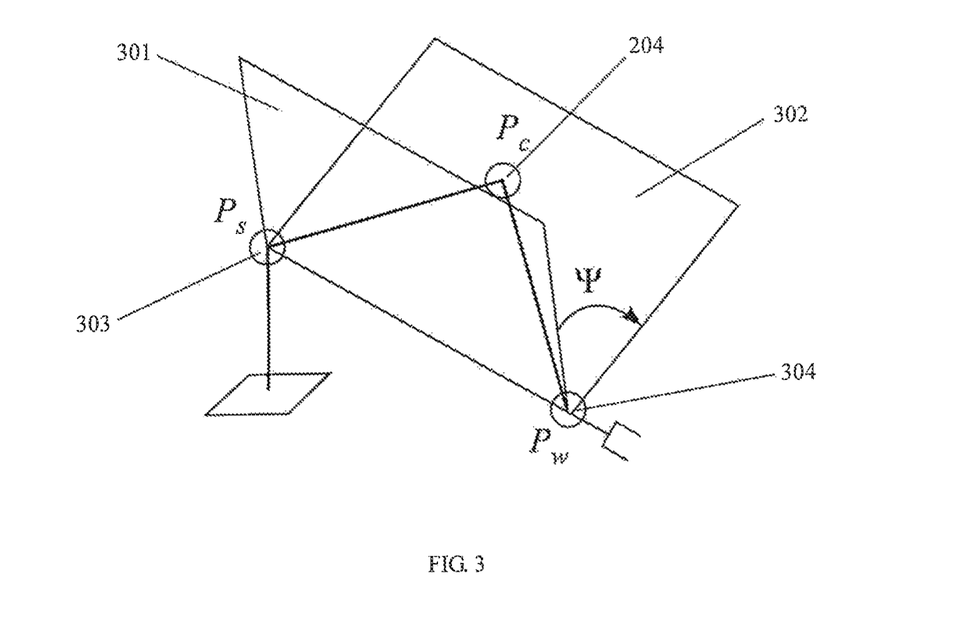
FIG. 3 is a schematic diagram of an arm angle in the motion planning method for the robot arms according to the present application.

In some embodiments, the joints may be defined according to the structure of a human body. For example, as illustrated in FIG. 2 and FIG. 3, a joint 201, a joint 202 and a joint 203 are located at the shoulder of the human body and may be defined as shoulder joints 303. A joint 204 is located at the elbow of the human body and may be defined as the elbow joint of the human body. And the joint 205, the joint 206 and the joint 207 are located at the wrist of the human body and may be defined as wrist joints 304. The tail end position is the position where the wrist joints 304 are located. Referring to FIG. 3, the shoulder joint 303, the joint 204 and the wrist joint 304 form a surface 301; after the robot arm moves, the shoulder joints 303, the joint 204 and the wrist joint 304 re-form a new surface 302; and an angle between the surface 301 and the surface 302 in the space is the arm angle.

The motion trajectory refers to a motion curve formed by connecting various poses at the tail end of the robot arm.

Figure 4:
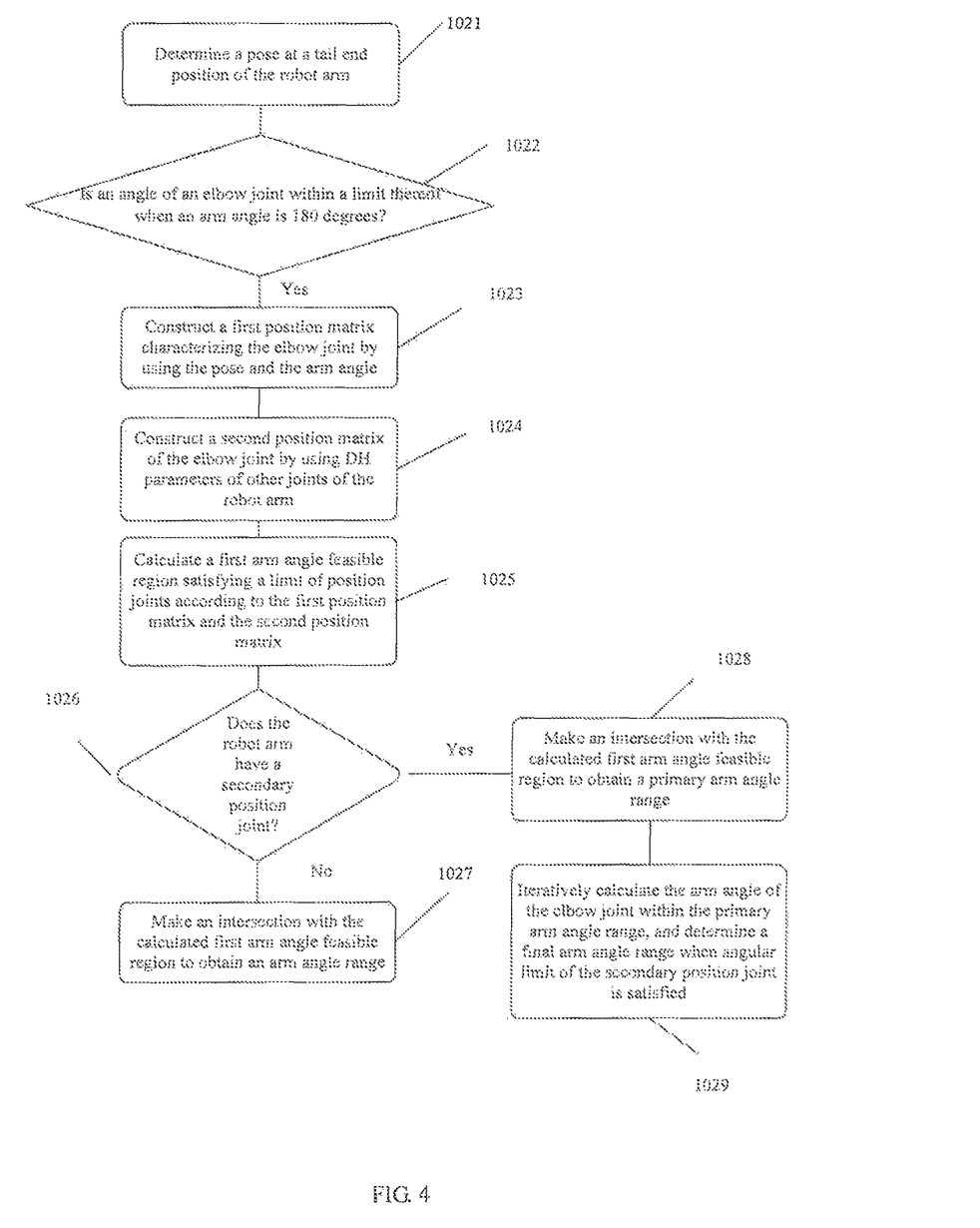
FIG. 4 is a flowchart of calculating an arm angle range of the robot arm in the motion planning method for the robot arms according to the present application.

Step 102: An arm angle range of each pose of the tail end of the robot arm in the motion trajectory is calculated, and an upper boundary curve and a lower boundary curve are generated according to the arm angle range. In some embodiments, as illustrated in FIG. 4, the method for calculating the arm angle range of each pose in the motion trajectory at the tail end of the robot arm includes the following steps:

Step 1021: A pose at a tail end position of the robot arm is determined.

Step 1022: Whether an angle of an elbow joint is within a limit thereof is determined when an arm angle is 180 degrees, if the angle is within the limit, step 1023 is performed.

Step 1023: A first position matrix characterizing the elbow joint is constructed by using the pose and the arm angle.

Step 1024: A second position matrix of the elbow joint is constructed by using DH parameters of other joints of the robot arm.

Step 1025: A first arm angle feasible region satisfying a limit of position joints is calculated according to the first position matrix and the second position matrix, wherein the position joints are the other joints which are rotatable in the robot arm and affect the position of the elbow joint.

Step 1026: Whether the robot arm has a secondary position joint is determined, wherein the secondary position joints are the other joints which are rotatable in the robot arm but do not affect the position of the elbow joint. If no secondary position joint is present, step 1027 is performed; and otherwise, step 1028 is performed.

Step 1027: An intersection is made with the calculated first arm angle feasible region to obtain an arm angle range.

Step 1028: An intersection is made with the calculated first arm angle feasible region to obtain a primary arm angle range.

Step 1029: The arm angle of the elbow joint is iteratively calculated within the primary arm angle range, and a final arm angle range when angular limit of the secondary position joint is satisfied is determined.

In some embodiments, the step of constructing the second position matrix of the elbow joint using the DH parameters of the other joints of the robot arm includes:

categorizing the other joints in the robot arm into front-end joints and rear-end joints according to a position of the elbow joint in the robot arm;

parameterizing the position of the elbow joint by using the DH parameters of the front-end joints; and parameterizing the position of the elbow joint by using the DH parameters of the rear-end joints.

In some embodiments, the step of parameterizing the position of the elbow joint by using the DH parameters of the front-end joints includes:

acquiring a joint transformation matrix constructed for the robot arm based on the DH parameters;

determining a position matrix of each joint in the front-end joints according to the joint transformation matrix; and calculating a position matrix in an origin coordinate system of the elbow joint according to the position matrix of each joint in the front-end joints and in combination with a positive kinematics formula $^{0}_{i}T = ^{j-1}T *_{i-1}^{0}T$ to obtain tri-coordinates of the elbow joint position represented by the parameters of the front-end joints.

The step of parameterizing the position of the elbow joint by using the DH parameters of the rear-end joints includes:

acquiring a joint transformation matrix constructed for the robot arm based on the DH parameters;

determining a position matrix of each joint in the rear-end joints according to the joint transformation matrix; and calculating a pose matrix in an origin coordinate system of the elbow joint according to the position matrix of each joint in the rear-end joints and in combination with a positive kinematics formula $^i_0T = {}_{i-1}^{T*}{}_{i-1}T$ to obtain tri-coordinates of the elbow joint position represented by the DH parameters of the rear-end joints.

The step of constructing the first, position matrix characterizing the elbow joint by using the pose and the arm angle includes:

constructing the first position matrix of the elbow joint based on an equation of a spatial circle C and in combination with the arm angle, wherein the spatial circle C is determined by the pose, and the first position matrix is as follows:

[Pc(1)+R*cos(Phi)*u(1)+R*sin(Phi)*v(1);Pc(2)+
R*cos(Phi)*u(2)+R*sin(Phi)*v(2);Pc(3)+R*cos
(Phi)*u(3)+f*sin(Phi)*v(3)]

wherein Pc(1), Pc(2) and Pc(3) represent tri-coordinates of the tail end position in the origin coordinate system, Phi represents an arm angle, R represents a shortest distance of the elbow joint to a line connecting coordinate a origin and the tail end position, u represents a direction vector of a line connecting the elbow joint to a droop vertical to a line connecting the coordinate origin and the tail end position, and v represents a product of a direction vector of a line connecting the droop to the coordinate origin and u.

The step of calculating the first arm angle feasible region satisfying the limit of position joints according to the first position matrix and the second position matrix includes:

combining the first position matrix and the second position matrix to obtain a solving equation of the arm angle of the elbow joint; and substituting the limit of the position joints to the solving equation to obtain an arm angle feasible region corresponding to the elbow joint.

Figure 5:
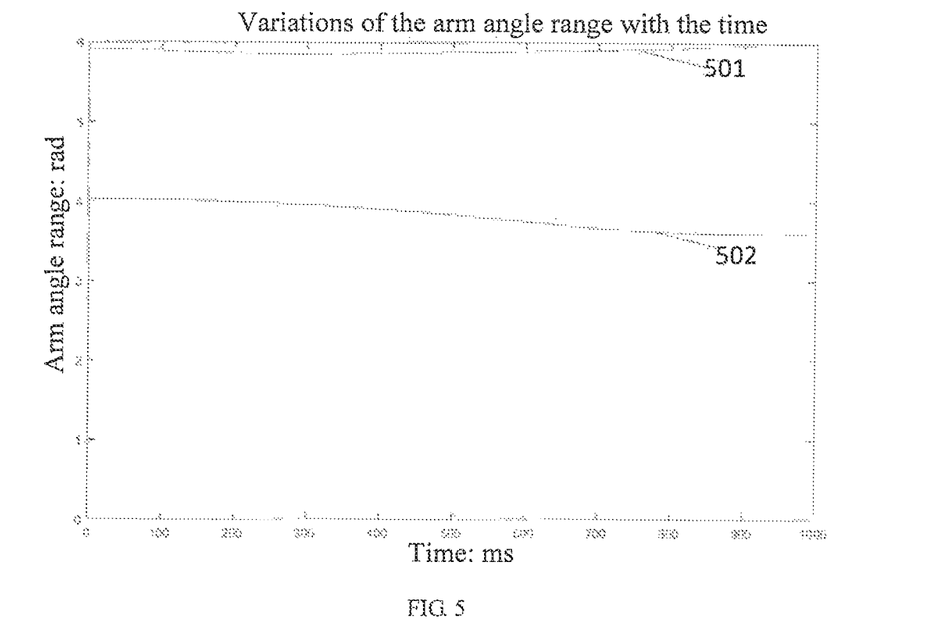
FIG. 5 is a schematic diagram of only one arm angle range for each pose in the motion planning for the robot arm according to an embodiment of the present application.
Figure 6:
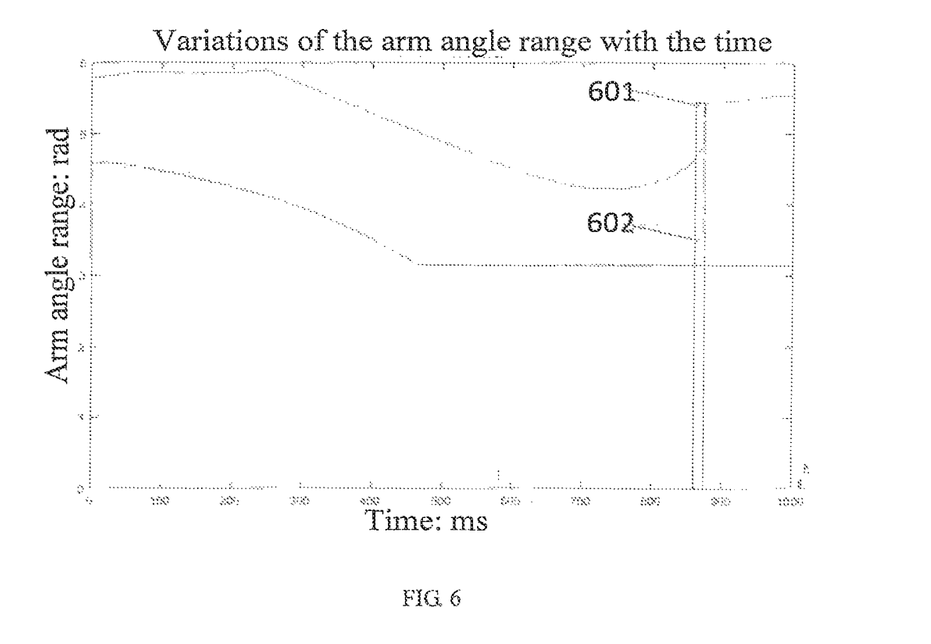
FIG. 6 is a schematic diagram of two arm angle ranges in the motion planning for the robot arms according to another embodiment of the present application.

Since the arm angle range calculated according to the pose may include only one range. As illustrated in FIG. 5, a schematic diagram of only one arm angle range for each pose in the motion planning for the robot arm according to an embodiment of the present application is illustrated. In FIG. 5, 501 represents an upper boundary of the arm angle range, and 502 represents a lower boundary of the arm angle range. The arm angle range calculated according to the pose may probably include two non-contiguous range. As illustrated in FIG. 6, a schematic diagram of two arm angle ranges for several poses in the motion planning for the robot arm according to another embodiment of the present application. As illustrated in FIG. 6, in this embodiment, within a period of time between 800 ms and 900 ms, a pose corresponds to two arm angle ranges, that is, a first arm angle range 601 and a second arm angle range 602.

When a pose has two arm angle ranges, the boundary curve may not be generated by directly using the two arm angle ranges, but one arm angle range needs to be selected to construct the boundary curve. Specifically, step 102 may specifically include:

when a quantity of arm angle ranges corresponding to one of the poses is 1, and a quantity of arm angle ranges corresponding to a previous pose is also 1, selecting an arm angle range corresponding to the pose;

when a quantity of arm angle ranges corresponding to one of the poses is 2, backward calculating arm angle ranges corresponding to the other poses until a pose with a single arm angle range is detected. When the detected pose with the single arm angle range is not an end pose of the motion trajectory, selecting an arm angle range with a minimum sum of an upper boundary and a lower boundary from the two arm angle ranges. And when the detected pose with the single arm angle range is the end pose of the motion trajectory, selecting an arm angle range with a minimum difference between the upper boundary and the lower boundary;

when a quantity of arm angle ranges corresponding to one of the poses is 1, and a quantity of arm angle ranges corresponding to a previous pose is 2, selecting an arm angle range corresponding to the pose; or when a quantity of arm angle ranges corresponding to one of the poses is 2, and a quantity of arm angle ranges corresponding to a previous pose is also 2, selecting an arm angle range with a minimum sum of an upper boundary and a lower boundary from the two arm angle ranges; and generating the upper boundary curve and the lower boundary curve according to the selected arm angle range.

Since the upper boundary curve and the lower boundary curve are formed by a plurality of curve segments, a sawtooth shape may be caused. The sawtooth-shaped curves are filtered, such that the upper and lower boundary curves become smooth. The filtering may be mean filtering.

Step 103: A start arm angle value of a start pose of the tail end of the robot arm in the motion trajectory is calculated.

In some embodiments, the start arm angle value of the start pose may be determined according to a predetermined mode. For example, a median between an upper boundary value and a lower boundary value in the arm angle range is selected as the start arm angle value.

Step 104: An arm angle proportion is calculated according to the start arm angle value and the arm angle range of the start pose.

The arm angle proportion is calculated by using the following formula:

$$\text{Prop} = \frac{\alpha - LLimit}{ULimit - LLimit}$$

wherein Prop represents a proportion of an arm angle value in the arm angle range, α represents the arm angle value, LLimit represents a lower boundary value of the arm angle range, ULimit represents an upper boundary value of the arm angle range.

Step 105: An abruptly changing arm angle range in the arm angle range of each pose is identified according to the upper boundary curve and the lower boundary curve.

The abruptly changing arm angle range includes an increasing arm angle range that abruptly increases and a decreasing arm angle range that abruptly decreased. The increasing arm angle range and the decreasing arm angle range may be identified in different ways. Specifically, step 105 may include:

calculating an upper boundary derivative of each pose on the upper boundary curve, and a lower boundary derivative of each pose on the lower boundary curve; and that is, a derivative is calculated for the upper boundary curve and the lower boundary curve, i.e., a slope of the curves at the point is calculated;

determining that the arm angle range of the pose is the decreasing arm angle range when the upper boundary derivative of the pose is less than a negative threshold and the lower boundary derivative of the pose is greater than a positive threshold;

that is, when the upper boundary derivative of the pose is less than the negative threshold, i.e., the upper boundary curve falls excessively quickly, and the lower boundary derivative of the pose is greater than the positive threshold, i.e., the lower boundary curve rises excessively quickly, the arm angle range of the pose at this moment is the decreasing arm angle range; or determining that the arm angle range of the pose is the increasing arm angle range when the upper boundary derivative of the pose is greater than a positive threshold and the lower boundary derivative of the pose is less than a negative threshold;

that is, when the upper boundary derivative of the pose is greater than the positive threshold, i.e., the upper boundary curve rises excessively quickly, and the lower boundary derivative of the pose is less than the negative threshold, i.e., the lower boundary curve falls excessively quickly, the arm angle range of the pose at this moment is the increasing arm angle range.

Step 106: An arm angle of a pose corresponding to the abruptly changing arm angle is calculated according to a predetermined correction model, and arm angles corresponding to the other poses are calculated according to the arm angle proportion, wherein the other poses are poses other than the pose corresponding to the abruptly changing arm angle range.

Since the abruptly changing arm angle range is present in the arm angle range, the step of calculating the arm angle of the pose corresponding to the abruptly changing arm angle according to the predetermined correction model includes:

calculating an arm angle of a pose corresponding to the increasing arm angle range according to a predetermined large arm angle proportion when the abruptly changing arm angle range is the increasing arm angle range;

the predetermined large arm angle proportion is a value that is predefined, for example, 0.8, 0.7 or the like; and when the arm angle range abruptly increases, an arm angle value adjusted by the predetermined large arm angle proportion may prevent occurrence of abrupt changes of the arm angle value, and facilitate maintaining of the arm angle value;

calculating an arm angle of a pose corresponding to the decreasing arm angle range according to a predetermined small arm angle proportion when the abruptly changing arm angle range is the decreasing arm angle range.

The predetermined small arm angle proportion is a value, that is predefined, for example, 0.2, 0.3 or the like; and when the arm angle range abruptly decreases, an arm angle value adjusted by the predetermined large arm angle proportion may prevent occurrence of abrupt changes of the arm angle value, and facilitate maintaining of the arm angle value.

Figure 7:
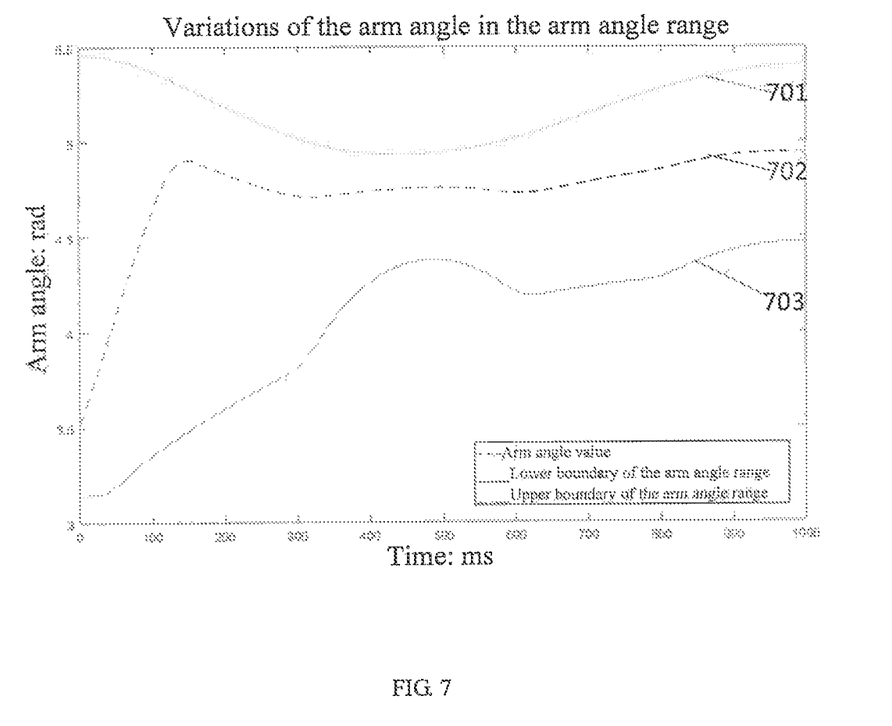
FIG. 7 is a schematic diagram of variations of an arm angle in the arm angle range in the motion planning for the robot arms according to another embodiment of the present application.

As illustrated in FIG. 7, 702 represents a curve formed by connecting the arm angles of various poses, 701 represents an upper boundary curve and 703 represents a lower boundary curve.

Step 107: An angle of a joint of the robot arm corresponding to each pose is calculated according to a pose of the tail end of the robot arm in the motion trajectory and the arm angle of each pose.

Figure 8:
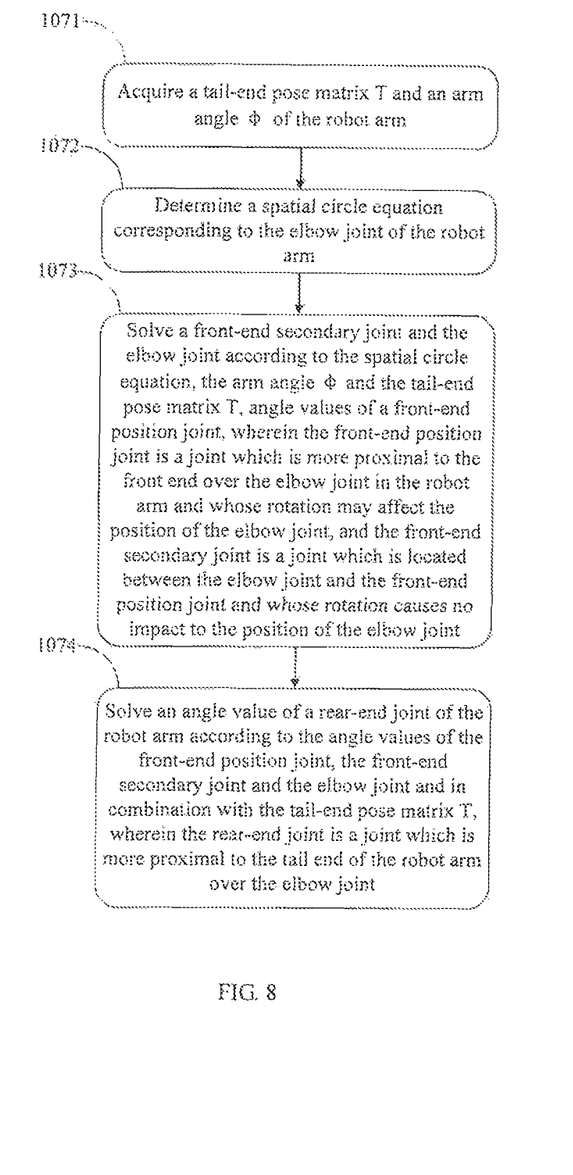
FIG. 8 is a flowchart of calculating a joint angle of the robot arm corresponding to each pose in the motion planning for the robot arms according to the present application.

The 7-DOF bias robot arm includes a shoulder joint group formed by a first joint, a second joint and a third joint, an elbow joint formed by a fourth joint, and a wrist joint group formed by a fifth joint, a sixth joint and a seventh joint. Rotation axes of the shoulder joint group intersect with a shoulder point S, a coordinate origin of the elbow joint is an elbow point E, and rotation axes of the wrist joint group intersect with a wrist point W. A surface defined by the shoulder point S, the elbow point E and the wrist point W is a reference surface. An angle defined by the reference surface and the arm angle surface around a vector SW in accordance with the right-hand rule is the arm angle. The vector SW is a vector pointing from the shoulder joint S to the wrist point W. As illustrated in FIG. 8, the method for calculating the joint angle of the robot arm corresponding to each pose includes the following steps:

Step 1071: A tail-end pose matrix T and an arm angle φ of the robot arm are acquired.

Step 1072: A spatial circle equation corresponding to the elbow joint of the robot arm is determined.

Step 1073: According to the spatial circle equation, the arm angle φ and the tail-end pose matrix T, angle values of a front-end position joint, a front-end secondary joint and the elbow joint are solved, wherein the front-end position joint is a joint which is more proximal to the front end over the elbow joint in the robot arm and whose rotation may affect the position of the elbow joint, and the front-end secondary joint is a joint which is located between the elbow joint and the front-end position joint and whose rotation causes no impact to the position of the elbow joint.

Step 1074: According to the angle values of the front-end position joint, the front-end secondary joint and the elbow joint and in combination with the tail-end pose matrix T, an angle value of a rear-end joint of the robot arm is solved, wherein the rear-end joint is a joint which is more proximal to the tail end of the robot arm over the elbow joint.

In some embodiments, step 1072 specifically includes:

acquiring an angle value of the front-end position joint in the reference surface of the arm angle of the robot when the arm angle of the robot arm is 0;

solving a position coordinate value Pe_rp of the elbow joint in the reference surface, a position coordinate value Pc of a circle center point C of a spatial circle and a radius R of the spatial circle according to the angle value of the front-end position joint in the reference surface of the arm angle of the robot arm; and solving a spatial circle equation according to the position coordinate value Pe_rp of the elbow joint in the reference surface, the position coordinate value Pc of the circle center point C and the radius R of the spatial circle.

In some embodiments, the front-end position joint includes a first joint and a second joint.

When the arm angle Φ is 0, an angle value q1_rp of the first joint in the) reference surface is calculated by using the formula q1_rp=atan2(Pw(2), Pw(1) wherein Pw represents a position coordinate value of the tail end W.

When the arm angle Φ is 0, an angle value q2_rp of the second joint in the reference surface is calculated by using the formula:

$$q2\_rp = Pi - (\text{atan2}(La2, La1) + \text{acos}((Lse^2 + Lsw^2 - Lew^2)/(2 \cdot Lse \cdot Lsw)) - \text{atan2}(Pw(3) - Ps(3), \text{sqrt}((Pw(1) - Ps(1))^2 + (Pw(2) - Ps(2))^2)))$$

wherein Pi represents the ratio π of the circumstance of a circle to its diameter, La1 represents a length of OS, La2 represents a length of SE, Lse represents a length of SE, Lsw represents a length of SW, Lew represents a length of EW, Pw represents a position coordinate value of the wrist point W, and Ps represents a position coordinate value of the shoulder point S.

In some embodiments, the position coordinate value $Pe\_rp$ of the elbow joint in the reference surface is calculated by using the following formula:

$$Pe\_rp=[-La1*\cos(q1\_rp)*\cos(q2\_rp)+La2*\cos(q1\_rp)*\sin(q2\_rp);La\ 2*\sin(q1\_rp)*\sin(q2\_rp)-La1*\cos(q2\_rp)*\sin(q1\_rp);-La\ 1*\sin(q2\_rp)-La2*\cos(q2\_rp)]$$

The position coordinate value Pc of the point C is calculated by using the following formula:

$$Pc=Ps+(Lsw-Lew)*(Pw-Ps)/Lsw$$

The radius R of the spatial circle is calculated by using the following formula:

$$R=Lew*\sin(a\cos((Lew^2+Lsw^2-Lse\ ^2)/(2*Lew*Lsw))).$$

Specifically, the spatial circle equation is as follows:

$$\text{Circle}=[Pc(1)+R*\cos(Phi)*u(1)+R*\sin(Phi)*v(1);Pc(2)+R*\cos(Phi)*u(2)+R*\sin(Phi)*v(2);Pc(3)+R*\cos(Phi)*u(3)+f*\sin(Phi)*v(3)]$$

wherein u represents a vector CE', v represents a vector obtained by cross-multiplying a vector CO by the vector u, and Phi represents an arm angle $\Phi$.

Further, the step of solving the angle values of the front-end position joint, the front-end secondary joint and the elbow joint according to the spatial circle equation, the arm angle $\Phi$ and the tail-end pose matrix T includes:

calculating a position of the elbow joint of the robot arm according to the spatial circle equation and the arm angle $\Phi$;

constructing a first transformation matrix between the front-end position joint and the elbow joint according to the tail-end pose matrix T;

calculating an angle of the front-end position joint according to the first transformation matrix and in combination with the position of the elbow joint;

calculating a position of the front-end secondary joint according to the angle of the front-end position joint; and calculating an angle value of the elbow joint according to the position of the front-end secondary joint, the position of the elbow joint and the position of the wrist joint.

Further, the step of solving the angle value of the rear-end joint of the robot arm according to the angle values of the front-end position joint, the front-end secondary joint and the elbow joint and in combination with the tail-end pose matrix T includes:

constructing a second transformation matrix between the rear-end joint and the front-end position joint or the front-end secondary joint according to the tail-end pose matrix T; and calculating a angle value of a rear-end position joint according to the second transformation matrix and in combination with the angle values of the front-end position joint, the front-end secondary joint and the elbow joint.

The rear-end position joints include a fifth joint, a sixth joint and a seventh joint. An angle value q5 of the fifth joint, an angle value q6 of the sixth angle and an angle value q7 of the seventh angle are calculated by using the following formulae respectively:

$$q5=\operatorname{atan2}(-{}^4_7T(2,3),-{}^4_7T(1,3));$$

$$q6=\operatorname{acos}({}^4_7T(3,3));$$

$$q7=-\operatorname{atan2}({}^4_7T(3,2),{}^4_7T(3,1)).$$

Figure 9:
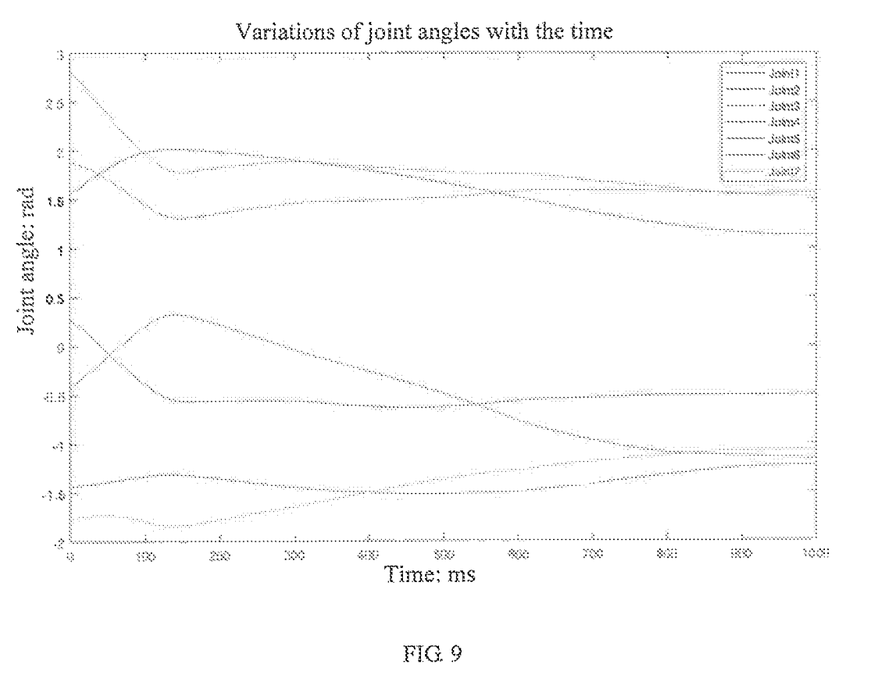
FIG. 9 is a schematic diagram of variations of angles of joints with the time in the motion planning for the robot arms according to an embodiment of the present application.

In some embodiments, during calculation of the angle values of the joints, whether the angle value of a joint exceeds an extreme value of the joint may be verified. If the angle value of a joint exceeds the extreme value thereof, the corresponding arm angle needs to be re-selected. Nevertheless, during re-selection of the arm angle, for the sake of continuity of the arm angle, an angle value proximal to the arm angle may be selected. As illustrated in FIG. 9, a schematic diagram of variations of angles of joints of a 7-DOF robot arm with the time is illustrated.

In the embodiment of the present application, with the motion planning method for the robot arms, a continuous joint rotation angle of the robot arm in the motion may be calculated, the robot arm may be ensured to stably and constantly move, and shaking in the motion of the robot arm may be prevented.

Figure 10:
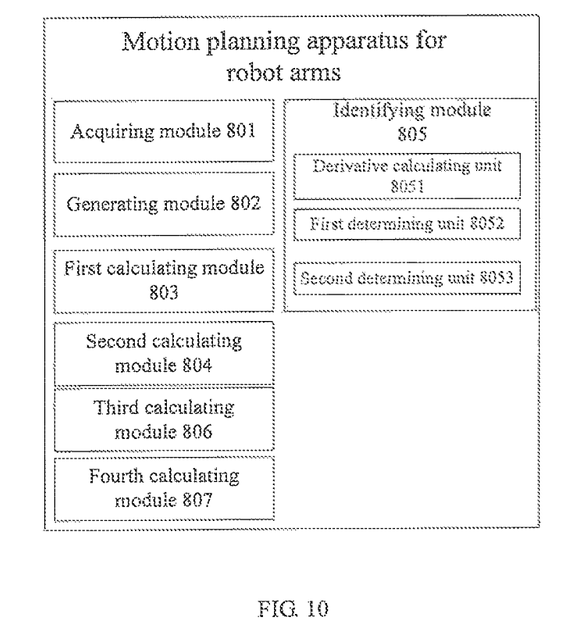
FIG. 10 is a functional block diagram of a motion planning apparatus for robot arms according to an embodiment of the present application.

An embodiment of the present application further provides a motion planning apparatus for robot arms. As illustrated in FIG. 10, the apparatus includes: an acquiring module 801, a generating module 802, a first calculating module 803, a second calculating module 804, an identifying module 805, a third calculating module 806 and a fourth calculating module 807.

The acquiring module 801 is configured to acquire a motion trajectory of a tail end of a robot arm.

The generating module 802 is configured to calculate an arm angle range of each pose of the tail end of the robot arm in the motion trajectory, and generate an upper boundary curve and a lower boundary curve according to the arm angle range.

The first calculating module 803 is configured to calculate a start arm angle value of a start pose of the tail end of the robot arm in the motion trajectory.

The second calculating module 804 is configured to calculate an arm angle proportion according to the start arm angle value and the arm angle range of the start pose.

The identifying module 805 is configured to identify an abruptly changing arm angle range in the arm angle range of each pose according to the upper boundary curve and the lower boundary curve.

The third calculating module 806 is configured to calculate an arm angle of a pose corresponding to the abruptly changing arm angle range according to a predetermined correction model, and calculate arm angles corresponding to the other poses according to the arm angle proportion, wherein the other poses are poses other than the pose corresponding to the abruptly changing arm angle range.

The fourth calculating module 807 is configured to calculate an angle of a joint of the robot arm corresponding to each pose according to a pose of the tail end of the robot arm in the motion trajectory and the arm angle of each pose.

Further, the identifying module 805 includes:

a derivative calculating unit 8051, configured to calculate an upper boundary derivative of each pose on the upper boundary curve, and a lower boundary derivative of each pose on the lower boundary curve;

a first determining unit 8052, configured to determine that the arm angle range of the pose is the decreasing arm angle range when the upper boundary derivative of the pose is less than a negative threshold and the lower boundary derivative of the pose is greater than a positive threshold; and a second determining unit 8053, configured to determine that the arm angle range of the pose is the decreasing arm angle range when the upper boundary derivative of the pose greater than a positive threshold and the lower boundary derivative of the pose is less than a negative threshold.

Further, the step of calculating the arm angle of the pose corresponding to the abruptly changing arm angle range performed by the third calculating module 806 according to the predetermined correction model specifically includes:

calculating an arm angle of a pose corresponding to the increasing arm angle range according to a predetermined large arm angle proportion when the abruptly changing arm angle range is the increasing arm angle range;

calculating an arm angle of a pose corresponding to the decreasing arm angle range according to a predetermined small arm angle proportion when the abruptly changing arm angle range is the decreasing arm angle range.

Further, the third calculating module 806 is configured to calculate the arm angles corresponding to the other poses according to the arm angle proportion by using the following formula:

$$\text{Prop} = \frac{\alpha - LLimit}{ULimit - LLimit}$$

wherein Prop represents a proportion of an arm angle value in the arm angle range, $\alpha$ represents the arm angle value, LLimit represents a lower boundary value of the arm angle range, ULimit represents an upper boundary value of the arm angle range.

An embodiment of the present application provides a non-volatile computer-readable storage medium, wherein the computer-readable storage medium stores at least one computer-executable instruction, which may be executed to perform the motion planning method for the robot arms in any of the above method embodiments.

Figure 11:
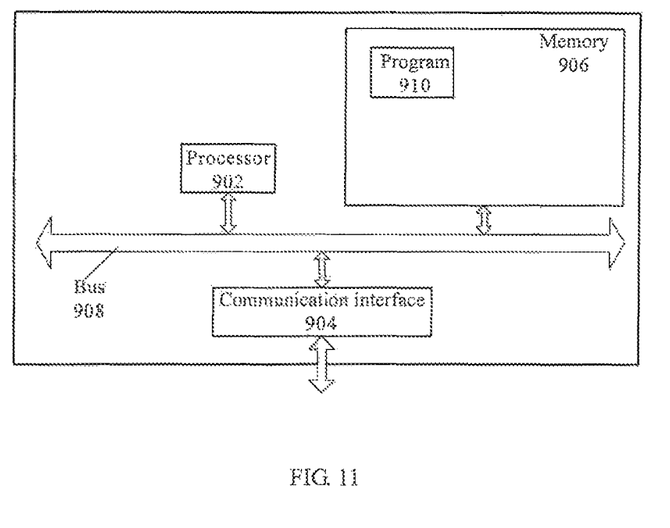
FIG. 11 is a functional block diagram of a computing device according to an embodiment of the present application.

FIG. 11 is a schematic structural diagram of a computing device according to an embodiment of the present application. The specific embodiments of the present application set no limitation to the practice of the computing device.

As illustrated in FIG. 11, the computing device may include: a processor 902, a communication interface 904, a memory 906 and a communication bus 908.

The processor 902, the communication interface 904 and the memory 906 communicate with each other via the communication bus 908.

The communication interface 904 is configured to communicate with a network element such as a client, a server or the like.

The processor 902 is configured to execute a program 910, and may specifically perform steps in the embodiments of the motion planning method for the robot arms.

Specifically; the program 910 may include a program code, wherein the program code includes a computer-executable instruction.

The processor 902 may be a central processing unit (CPU) or an application specific integrated circuit (ASIC), or configured as one or more integrated circuits for implementing the embodiments of the present application. The computing device includes one or more processors, which may be the same type of processors, for example, one or more CPUs, or may be different types of processors, for example, one or more CPUs and one or more ASICs.

The memory 906 is configured to store the program 910. The memory 906 may include a high-speed RAM memory, or may also include a non-volatile memory, for example, at least one magnetic disk memory.

The program 910 may be specifically configured to cause the processor 902 to perform the following operation:

acquiring a motion trajectory of a tail end of a robot arm:

In an optional implementation, the program 910 may be specifically further configured to cause the processor 902 to perform the following operation:

calculating an arm angle range of each pose of the tail end of the robot arm in the motion trajectory, and generating an upper boundary curve and a lower boundary curve according to the arm angle range.

In an optional implementation, the program 910 may be specifically further configured to cause the processor 902 to perform the following operation:

calculating a start arm angle value of a start pose of the tail end of the robot arm in the motion trajectory.

In an optional implementation, the program 910 may be specifically further configured to cause the processor 902 to perform the following operation:

calculating an arm angle proportion according to the start arm angle value and the arm angle range of the start pose.

In an optional implementation, the program 910 may be specifically further configured to cause the processor 902 to perform the following operation:

identifying an abruptly changing arm angle range in the arm angle range of each pose according to the upper boundary curve and the lower boundary curve.

In an optional implementation, the program 910 may be specifically further configured to cause the processor 902 to perform the following operation:

calculating an arm angle of a pose corresponding to the abruptly changing arm angle according to a predetermined correction model, and calculating arm angles corresponding to the other poses according to the arm angle proportion, wherein the other poses are poses other than the pose corresponding to the abruptly changing arm angle range.

In an optional implementation, the program 910 may be specifically further configured to cause the processor 902 to perform the following operation:

calculating an angle of a joint of the robot arm corresponding to each pose according to a pose of the tail end of the robot arm in the motion trajectory and the arm angle or each pose.

The present application further provides a robot arm embodiment. The robot arm includes an arm body and the computing device. With respect to the specific structure and functions of the computing device, reference may be made to the above embodiment, which are thus not described herein any further.

An embodiment of the present invention further provides a robot. The robot includes the above described robot arm. With respect to the specific structure and functions of the robot arm, reference may be made to the above robot arm embodiments, which are thus not described herein any further.

An embodiment of the present application further provides a robot. The robot includes a computing device. The computing device has the same structure and function as the computing device according to the above embodiment. For details of the structure and function of the computing device, reference may be made to the above embodiments, which are not described herein any further.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the message prompting apparatus according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A motion planning method for robot arms, comprising:
   acquiring a motion trajectory of a tail end of a robot arm;
   calculating an arm angle range of each pose of the tail end of the robot arm in the motion trajectory;
   generating an upper boundary curve and a lower boundary curve according to the arm angle range;
   calculating a start arm angle value of a start pose of the tail end of the robot arm in the motion trajectory;
   calculating an arm angle proportion according to the start arm angle value and the arm angle range of the start pose;
   identifying an abruptly changing arm angle range in the arm angle range of the each pose according to the upper boundary curve and the lower boundary curve, wherein the abruptly changing arm angle range comprises an increasing arm angle range and a decreasing arm angle range;
   calculating an arm angle of a pose corresponding to the abruptly changing arm angle range according to a predetermined correction model;
   calculating arm angles corresponding to other poses according to the arm angle proportion, wherein the other poses are poses other than the pose corresponding to the abruptly changing arm angle range; and
   calculating an angle of a joint of the robot arm corresponding to the each pose according to a pose of the tail end of the robot arm in the motion trajectory and the arm angle of the each pose.

2. The method according to claim 1, the step of identifying the abruptly changing arm angle range in the arm angle range of the each pose according to the upper boundary curve and the lower boundary curve comprises:
   calculating an upper boundary derivative of the each pose on the upper boundary curve, and a lower boundary derivative of the each pose on the lower boundary curve; and
   determining that the arm angle range of a first pose corresponding to the abruptly changing arm angle range is the decreasing arm angle range when the upper boundary derivative of one of the each pose is less than a negative threshold and the lower boundary derivative of one of the each pose is greater than a positive threshold; or
   determining that the arm angle range of a second pose is the increasing arm angle range when the upper boundary derivative of one of the each pose is greater than the positive threshold and the lower boundary derivative of one of the each pose is less than the negative threshold.

3. The method according to claim 2, wherein the step of calculating the arm angle of the pose corresponding to the abruptly changing arm angle range according to the predetermined correction model comprises:

Calculating the arm angle of the pose corresponding to the increasing arm angle range according to a predetermined large arm angle proportion when the abruptly changing arm angle range is the increasing arm angle range; or calculating the arm angle of the pose corresponding to the decreasing arm angle range according to a predetermined small arm angle proportion when the abruptly changing arm angle range is the decreasing arm angle range.

4. The method according to claim 2, wherein the arm angles corresponding to the other poses are calculated according to the arm angle proportion by using the following formula:

wherein Prop represents the arm angle proportion of the arm angle value in the arm angle range, a represents the arm angle value, LLimit represents a lower boundary value of the arm angle range, ULimit represents an upper boundary value of the arm angle range.

5. The method according to claim 1, wherein the step of generating the upper boundary curve and the lower boundary curve according to the arm angle range comprises:

when a quantity of arm angle ranges corresponding to one of the poses is 1, and a quantity of arm angle ranges corresponding to a previous pose is also 1, selecting an arm angle range corresponding to the pose;

when a quantity of arm angle ranges corresponding to one of the poses is 2, backward calculating arm angle ranges corresponding to the other poses until a pose with a single arm angle range is detected, when a detected pose with the single arm angle range is not an end pose of the motion trajectory, selecting an arm angle range with a minimum sum of an upper boundary and a lower boundary from the two arm angle ranges, and when the detected pose with the single arm angle range is the end pose of the motion trajectory, selecting an arm angle range with a minimum difference between the upper boundary and the lower boundary;

when a quantity of arm angle ranges corresponding to one of the poses is 1, and a quantity of arm angle ranges corresponding to a previous pose is 2, selecting an arm angle range corresponding to the pose; or when a quantity of arm angle ranges corresponding to one of the poses is 2, and a quantity of arm angle ranges corresponding to a previous pose is also 2, selecting an arm angle range with a minimum sum of an upper boundary and a lower boundary from the two arm angle ranges; and generating the upper boundary curve and the lower boundary curve according to a selected arm angle range.

6. A computing device, comprising: a processor, a memory, a communication interface, and a communication bus; wherein the processor, the memory and the communication interface communicate with each other via the communication bus; and the memory is configured to store at least one executable instruction, wherein the executable instruction, when being executed by the processor, causes the processor to perform the steps of:

acquiring a motion trajectory of a tail end of a robot arm;

calculating an arm angle range of each pose of the tail end of the robot arm in the motion trajectory;

generating an upper boundary curve and a lower boundary curve according to the arm angle range;

calculating a start arm angle value of a start pose of the tail end of the robot arm in the motion trajectory;

calculating an arm angle proportion according to the start arm angle value and the arm angle range of the start pose;

identifying an abruptly changing arm angle range in the arm angle range of the each pose according to the upper boundary curve and the lower boundary curve; wherein the abruptly changing arm angle range comprises an increasing arm angle range and a decreasing arm angle range;

calculating an arm angle of a pose corresponding to the abruptly changing arm angle range according to a predetermined correction model;

calculating arm angles corresponding to other poses according to the arm angle proportion, wherein the other poses are poses other than the pose corresponding to the abruptly changing arm angle range; and calculating an angle of a joint of the robot arm corresponding to each pose according to a pose of the tail end of the robot arm in the motion trajectory and the arm angle of each pose.

7. The computing device according to claim 6, the step of identifying the abruptly changing arm angle range in the arm angle range of the each pose according to the upper boundary curve and the lower boundary curve comprises:

calculating an upper boundary derivative of the each pose on the upper boundary curve, and a lower boundary derivative of the each pose on the lower boundary curve; and determining that the arm angle range of a first pose corresponding to the abruptly changing arm angle range is the decreasing arm angle range when the upper boundary derivative of one of the each pose is less than a negative threshold and the lower boundary derivative of one of the each pose is greater than a positive threshold; or determining that the arm angle range of a second pose is the increasing arm angle range when the upper boundary derivative of one of the each pose is greater than the positive threshold and the lower boundary derivative of one of the each pose is less than the negative threshold.

8. The computing device according to claim 7, wherein the step of calculating the arm angle of the pose corresponding to the abruptly changing arm angle range according to the predetermined correction model comprises:

calculating the arm angle of the pose corresponding to the increasing arm angle range according to a predetermined large arm angle proportion when the abruptly changing arm angle range is the increasing arm angle range; or calculating the arm angle of the pose corresponding to the decreasing arm angle range according to a predetermined small arm angle proportion when the abruptly changing arm angle range is the decreasing arm angle range.

9. The computing device according to claim 7, wherein the arm angles corresponding to the other poses are calculated according to the arm angle proportion by using the following formula:

wherein Prop represents the proportion of the arm angle value in the arm angle range, a represents the arm angle value, LLimit represents a lower boundary value of the arm angle range, ULimit represents an upper boundary value of the arm angle range.

10. The computing device according to claim 6, wherein the step of generating the upper boundary curve and the lower boundary curve according to the arm angle range comprises:
when a quantity of arm angle ranges corresponding to one of the poses is 1, and a quantity of arm angle ranges corresponding to a previous pose is also 1, selecting an arm angle range corresponding to the pose;
when a quantity of arm angle ranges corresponding to one of the poses is 2, backward calculating arm angle ranges corresponding to the other poses until a pose with a single arm angle range is detected, when a detected pose with the single arm angle range is not an end pose of the motion trajectory, selecting an arm angle range with a minimum sum of an upper boundary and a lower boundary from the two arm angle ranges, and when the detected pose with the single arm angle range is the end pose of the motion trajectory, selecting an arm angle range with a minimum difference between the upper boundary and the lower boundary;
when a quantity of arm angle ranges corresponding to one of the poses is 1, and a quantity of arm angle ranges corresponding to a previous pose is 2, selecting an arm angle range corresponding to the pose; or
when a quantity of arm angle ranges corresponding to one of the poses is 2, and a quantity of arm angle ranges corresponding to a previous pose is also 2, selecting an arm angle range with a minimum sum of an upper boundary and a lower boundary from the two arm angle ranges; and
generating the upper boundary curve and the lower boundary curve according to a selected arm angle range.

11. A robot, comprising a computing device,
the computing device comprising: a processor, a memory, a communication interface, and a communication bus;
wherein the processor, the memory and the communication interface communicate with each other via the communication bus; and
the memory is configured to store at least one executable instruction, wherein the executable instruction, when being executed by the processor, causes the processor to perform the steps;
acquiring a motion trajectory of a tail end of a robot arm;
calculating an arm angle range of each pose of the tail end of the robot arm in the motion trajectory;
generating an upper boundary curve and a lower boundary curve according to the arm angle range;
calculating a start arm angle value of a start pose of the tail end of the robot arm in the motion trajectory;
calculating an arm angle proportion according to the start arm angle value and the arm angle range of the start pose;
identifying an abruptly changing arm angle range in the arm angle range of the each pose according to the upper boundary curve and the lower boundary curve; wherein the abruptly changing arm angle range comprises an increasing arm angle range and a decreasing arm angle range;
calculating an arm angle of a pose corresponding to the abruptly changing arm angle range according to a predetermined correction model;
calculating arm angles corresponding to other poses according to the arm angle proportion, wherein the other poses are poses other than the pose corresponding to the abruptly changing arm angle range; and
calculating an angle of a joint of the robot arm corresponding to each pose according to a pose of the tail end of the robot arm in the motion trajectory and the arm angle of each pose.

12. The robot according to claim 11, wherein the step of identifying the abruptly changing arm angle range in the arm angle range of the each pose according to the upper boundary curve and the lower boundary curve comprises:
calculating an upper boundary derivative of the each pose on the upper boundary curve, and a lower boundary derivative of the each pose on the lower boundary curve; and
determining that the arm angle range of a first pose is the decreasing arm angle range when the upper boundary derivative of one of the each pose is less than a negative threshold and the lower boundary derivative of one of the each pose is greater than a positive threshold; or
determining that the arm angle range of a second pose is the increasing arm angle range when the upper boundary derivative of one of the each pose is greater than the positive threshold and the lower boundary derivative of one of the each pose is less than the negative threshold.

13. The robot according to claim 12, wherein the step of calculating the arm angle of the pose corresponding to the abruptly changing arm angle range according to the predetermined correction model comprises:
calculating the arm angle of the pose corresponding to the increasing arm angle range according to a predetermined large arm angle proportion when the abruptly changing arm angle range is the increasing arm angle range; or
calculating the arm angle of the pose corresponding to the decreasing arm angle range according to a predetermined small arm angle proportion when the abruptly changing arm angle range is the decreasing arm angle range.

14. The robot according to claim 12, wherein the arm angles corresponding to the other poses are calculated according to the arm angle proportion by using the following formula:
wherein Prop represents the proportion of the arm angle value in the arm angle range, a represents the arm angle value, LLimit represents a lower boundary value of the arm angle range, ULimit represents an upper boundary value of the arm angle range.

15. The robot according to claim 11, wherein the step of generating the upper boundary curve and the lower boundary curve according to the arm angle range comprises:
when a quantity of arm angle ranges corresponding to one of the poses is 1, and a quantity of arm angle ranges corresponding to a previous pose is also 1, selecting an arm angle range corresponding to the pose;
when a quantity of arm angle ranges corresponding to one of the poses is 2, backward calculating arm angle ranges corresponding to the other poses until a pose with a single arm angle range is detected, when a detected pose with the single arm angle range is not an end pose of the motion trajectory, selecting an arm angle range with a minimum sum of an upper boundary and a lower boundary from the two arm angle ranges, and when the detected pose with the single arm angle range is the end pose of the motion trajectory, selecting an arm angle range with a minimum difference between the upper boundary and the lower boundary;

when a quantity of arm angle ranges corresponding to one of the poses is 1, and a quantity of arm angle ranges corresponding to a previous pose is 2, selecting an arm angle range corresponding to the pose; or when a quantity of arm angle ranges corresponding to one of the poses is 2, and a quantity of arm angle ranges corresponding to a previous pose is also 2, selecting an arm angle range with a minimum sum of an upper boundary and a lower boundary from the two arm angle ranges; and generating the upper boundary curve and the lower boundary curve according to selected arm angle range.

* * * * *